United States Patent

[19]

Ide et al.

[11] Patent Number: 6,058,717

[45] Date of Patent: May 9, 2000

[54] METHOD FOR CHARGING REFRIGERANT BLEND

[75] Inventors: Satoshi Ide; Takashi Shibanuma, both of Settsu, Japan

[73] Assignee: Daikin Industries, Ltd., Japan

[21] Appl. No.: 09/117,103

[22] PCT Filed: Nov. 25, 1997

[86] PCT No.: PCT/JP97/04298

§ 371 Date: Oct. 13, 1998

§ 102(e) Date: Oct. 13, 1998

[87] PCT Pub. No.: WO98/23703

PCT Pub. Date: Jun. 4, 1998

[30] Foreign Application Priority Data

Nov. 28, 1996 [JP] Japan ................................ 8-318126

[51] Int. Cl.⁷ ................................................ F25B 41/00
[52] U.S. Cl. .......................................... 62/114; 252/71
[58] Field of Search .............................. 62/114, 77, 149; 252/71, 67

[56] References Cited

U.S. PATENT DOCUMENTS

| | | | |
|---|---|---|---|
| 5,643,492 | 7/1997 | Shiflett | 252/67 |
| 5,709,092 | 1/1998 | Shiflett | 62/114 |
| 5,709,093 | 1/1998 | Cerri et al. | 62/114 |
| 5,720,895 | 2/1998 | Nakagawa et al. | 252/68 |

FOREIGN PATENT DOCUMENTS

| | | |
|---|---|---|
| 157810 | 6/1996 | Japan. |
| 9314740 | 7/1993 | United Kingdom ............... 62/114 |

*Primary Examiner*—Henry Bennett
*Assistant Examiner*—Melvin Jones
*Attorney, Agent, or Firm*—Larson & Taylor PLC

[57] ABSTRACT

The present invention provides a method for charging a refrigerant blend characterized in that, in case of employing as refrigerant a non-azeotropic blend comprising 23% by weight of difluoromethane, 25% by weight of pentafluoroethane and 52% of 1,1,1,2-tetrafluoroethane, composition change associated with transfer is allow to fall within the permissible range of performance of the non-azeotropic refrigerant blend by adjusting a composition of the non-azeotropic blend in a feeding container such as bomb to 23.5–25.0% by weight of difluoromethane, 23.5–25.0% by weight of pentafluoroethane and 50.0–53.0% by weight of 1,1,1,2-tetrafluoroethane followed by discharging the non-azeotropic blend from a liquid phase at 40° C. or less. According to the charging method, composition change associated with transfer of non-azeotropic HFC32/HFC125/HFC134a refrigerant blend may be allowed to fall within the permissible range of performance of refrigerant.

3 Claims, No Drawings

US 6,058,717

METHOD FOR CHARGING REFRIGERANT BLEND

TECHNICAL FIELD

The present invention relates to a method for charging a non-azeotropic refrigerant blend comprising 23% by weight of difluoromethane, 25% by weight of pentafluoroethane and 52% by weight of 1,1,1,2-tetrafluoroethane used as a working fluid for vapor compression refrigeration cycle.

BACKGROUND ART

Vapor compression refrigeration cycle to perform cooling and heating of fluids by the use of state change of material such as evaporation and condensation has found a widespread use for applications such as an air-conditioner, refrigerator, hot-water supplier, etc. A variety of working fluids which are applied for the vapor compression refrigeration cycle, especially fluorocarbon refrigerants, have been developed and practically used. Among the fluids, HCFC22 (monochlorodifluoromethane) is widely used as a refrigerant in a heating and cooling system for air-conditioning.

However, chlorofluorocarbons were recently found to be responsible for the destruction of the ozone layer when released into the stratosphere and eventually exert seriously adverse effects on the ecosystem including human on the earth. Then, a worldwide agreement calls for the restriction of use and in the future total abolition thereof. Under these circumstances, there is an urgent demand for developing a new refrigerant which has no or little potential to cause the problem of depleting the ozone layer.

As attempts to make up for insufficient performances of a single component refrigerant by the use of refrigerant blends, many proposals for using non-azeotropic refrigerant blends have recently been raised (e.g., Japanese Unexamined Patent Publication No. 79288/1989, Japanese Examined Patent Publication No. 55942/1994, and Japanese Unexamined Patent Publication No. 287688/1991).

A non-azeotropic mixture causes a composition change during phase change such as evaporation and condensation, since a component having lower boiling point is likely to be evaporated and a component having higher boiling point is likely to be condensed. The tendency of composition change is pronounced in the case of evaporation, i.e., phase change from liquid to vapor, and the tendency is particularly pronounced as differences of boiling point between components are larger. Therefore, when such a non-azeotropic blend is transferred from one container to another, it is common practice to discharge it from liquid phase so as not to arise the phase change. However, even in the case of discharging a refrigerant blend from liquid phase, phase change as much as a few percent occurs in the case where the differences in boiling points are large between components. This is because discharging the blend causes a decrease of pressure and increase of the gaseous space, resulting in evaporation of lower-boiling-point components from liquid phase. A few percent of composition change cause a significant change in performances of refrigerant, and the change not only results in a decrease in capability and efficiency of the refrigerant, but also adversely affects safety of refrigerants such as flammability.

In particular, when using as a refrigerant a non-azeotropic blend comprising 23% by weight of difluoromethane (thereafter referred to as "HFC32"), 25% by weight of pentafluoroethane (thereafter referred to as "HFC125") and 52% by weight of 1,1,1,2-tetrafluoroethane (thereafter referred to as "HFC134a"), which is considered as the most promising substitute for HCFC22, the composition change thereof caused during transfer of the refrigerant from a bomb and like feeding container, to an air-conditioner is a serious problem, since ASHRAE STANDARD (1994) establishes the permissible composition range of HFC32(21–25% by weight), HFC125(23–27% by weight) and HFC134a (50–54% by weight).

As a method to solve the problem, Japanese Unexamined Patent Publication No. 157810/1996 proposes a method for allowing the composition to fall within the range of the tolerance of the composition by increasing in the blend composition lower boiling point components beforehand which are decreased with composition change.

Since a permissible range of performance of refrigerant is usually within ±3% by weight, in particular ±2% by weight with respect to the standard value, a biased composition concerning lower-boiling-point components according to the method enlarges differences of performance of refrigerant from the standard value.

DISCLOSURE OF THE INVENTION

The inventors conducted extensive research on a method for charging a liquid gas so as to solve the problem associated with the composition change which occurs when a non-azeotropic blend comprising three types of liquid gases having different boiling points and stored in a sealed vessel is transferred from a liquid-containing container to another container.

As a result, the inventors found a method for charging a refrigerant blend characterized in that in case of employing a non-azeotropic mixture comprising 23% by weight of difluoromethane, 25% by weight of pentafluoroethane and 52% by weight of 1,1,1,2-tetrafluoroethane as refrigerant, composition change associated with transfer of the refrigerant blend may be allowed to fall within the permissible range of performance of refrigerant blend by adjusting a blend composition in a bomb and like feeding container to 23.5–25.0% by weight of difluoromethane, 23.5–25.0% by weight of pentafluoroethane and 50.0–53.0% by weight of 1,1,1,2-tetrafluoroethane, followed by discharging the refrigerant from the liquid phase at not more than 40° C.

The invention relates to a method for charging a refrigerant blend characterized in that in case of employing a non-azeotropic mixture comprising 23% by weight of difluoromethane, 25% by weight of pentafluoroethane and 52% by weight of 1,1,1,2-tetrafluoroethane as refrigerant, composition change associated with transfer of the refrigerant falls within the permissible range of performance of refrigerant, by adjusting the blend component in a bomb and like feeding container to about 23.5–25.0% by weight of difluoromethane, about 23.5–25.0% by weight of pentafluoroethane and about 50.0–53.0% by weight of 1,1,1,2-tetrafluoroethane, followed by discharging the refrigerant from the liquid phase at not more than about 40° C.

In addition, the present invention relates to a method for producing a vapor compression refrigerating equipment with a composition range of 23% by weight of difluoromethane, 25% by weight of pentafluoroethane and 52% by weight of 1,1,1,2-tetrafluoroethane comprising discharging a liquid phase in a feeding container which has a blend composition of about 23.5–25.0% by weight of difluoromethane, about 23.5–25.0% by weight of pentafluoroethane and about 50.0–53.0% by weight of 1,1,1,2-tetrafluoroethane at not more than about 40° C. and transferring it to a main body of the vapor compression refrigerating equipment.

According to the invention, the temperature during discharge of the liquid phase in feeding container is up to about 40° C., preferably about 20–30° C.

According to the production method of the invention, known refrigerating equipments may be widely used as the main body of vapor compression refrigerating equipment.

The non-azeotropic refrigerant blend comprising 23% by weight of difluoromethane, 25% by weight of pentafluoroethane and 52% by weight of 1,1,1,2-tetrafluoroethane is, in particular, an object of the invention. However, the idea of the invention may be applied to other composition ranges, or, liquid gases of non-azeotropic compositions comprising other components having different boiling points. A blend comprising difluoromethane and 1,1,1,2-tetrafluoroethane, and a blend comprising pentafluoroethane, 1,1,1-trifluoroethane and 1,1,1,2-tetrafluoroethane may be exemplified.

Examples of the vapor compression refrigerating equipment of the invention are an air-conditioner, freezer, refrigerator and hot-water supplier.

Feeding containers according to the present invention are not specifically limited insofar as the container is a sealed container capable of storing a refrigerant blend. For example, a bomb is exemplified. As equipments to which a refrigerant blend is transferred and charged, any equipment which utilizes vapor compression refrigeration cycle can be used. Said equipments include, but are not specifically limited to, an air-conditioner, freezer, refrigerator, hot-water supplier, etc.

EXAMPLES

The present invention is illustrated with reference to the following examples, but it is to be understood that the invention is not limited to the examples unless the scope of the invention is departed from.

Example 1 and Comparative example 1

To a 10 liter sealed container, 9 kg of a non-azeotropic mixture of difluoromethane (HFC32), pentafluoroethane (HFC125) and 1,1,1,2-tetrafluoroethane (HFC134a) having the upper limit composition (25.0/25.0/5 0.0% by weight; example 1) or the lowest limit composition (21.0/25.0/54.0% by weight; comparative example 1) of the permissible range with respect to the standard composition (23.0/25.0/52.0% by weight) was charged. The container was placed into a thermostatic chamber in which the temperature was maintained at 10° C. or 40° C.

The mixture from the liquid phase was then transferred to another empty container at a rate of 900 g/min by means of a pump. A portion of the charging gas was withdrawn through a sampling valve located on a charging pipe near the liquid phase and the composition was analyzed by gas chromatography.

Performance of refrigerant composition at the beginning and end of charging was compared under conditions of refrigeration cycle that evaporating temperature was 0° C.; condensing temperature was 50° C.; overheating and supercooling were 0° C. to determine difference from standard composition. The results are shown in Table 1.

TABLE 1

Transfer Ratio and Analysis of Collected Gas Composition

| | HFC | | | Coefficient of Performance (difference) | Refrigerating Capacity (difference) | |
|---|---|---|---|---|---|---|
| | 32 | 125 | 134a | (wt. %) | $KJ/m^3-$ | (wt. %) |
| Standard Composition 10° C. | 23.0 | 25.0 | 52.0 | 3.94 (0) | 2947 | (0) |
| Upper limit | | | | | | |
| beginning | 24.9 | 24.9 | 50.2 | 3.94 (0) | 3012 | (+2.2) |
| end | 24.3 | 24.4 | 51.3 | 3.94 (0) | 2986 | (+1.3) |
| Lowest limit | | | | | | |
| beginning | 20.9 | 24.9 | 54.2 | 3.95 (+0.3) | 2873 | (−2.5) |
| end | 20.3 | 24.4 | 55.3 | 3.95 (+0.3) | 2848 | (−3.4) |
| 40° C. | | | | | | |
| Upper limit | | | | | | |
| beginning | 24.8 | 24.8 | 50.4 | 3.94 (0) | 3007 | (+2.0) |
| end | 23.6 | 23.8 | 52.6 | 3.95 (+0.3) | 2956 | (+0.3) |
| Lowest limit | | | | | | |
| beginning | 20.8 | 24.8 | 54.4 | 3.95 (+0.3) | 2869 | (−2.6) |
| end | 19.6 | 23.8 | 56.6 | 3.96 (+0.5) | 2817 | (−4.4) |

The refrigerating capacity values of the compositions at the end of charging were decreased more than 3% with respect to the standard value at both 10° C. and 40° C.

Example 2

HFC32/HFC125/HFC134a having a weight ratio of 23.5/23.5/53.0 (the lowest limit) was transferred.

The conditions of transfer were the same as those of example 1 except that temperature of thermostatic chamber was 40° C. which was the worst condition. The results are shown in table 2.

Example 3

Performance of refrigerant composition of example 2 charged at 40° C. was compared under conditions of refrigeration cycle that evaporating temperature was 0° C.; condensing temperature was 50° C.; overheating and supercooling were 0° C. The results of example 3 together with the results of example 2 are shown in Table 2.

TABLE 2

Transfer Ratio and Analysis of Collected Gas Composition

| | HFC | | | Coefficient of Performance (difference) | | Refrigerating Capacity (difference) | |
|---|---|---|---|---|---|---|---|
| | 32 | 125 | 134a | (wt. %) | KJ/m³– | (wt. %) | |
| Standard Composition Example 2 lowest limit | 23.0 | 25.0 | 52.0 | 3.94 (0) | | 2947 | (0) |
| beginning | 23.3 | 23.4 | 53.3 | 3.95 (+0.3) | | 2941 | (−0.2) |
| end | 22.1 | 22.4 | 55.5 | 3.97 (+0.8) | | 2889 | (−2.0) |

Composition change associated with transfer of non-azeotropic HFC32/HFC125/HFC134a refrigerant blend used as a working fluid for vapor compression refrigeration cycle may be allowed to fall within the permissible range (±3% by weight, preferably ±2% by weight) of performance of refrigerant (coefficient of performance, refrigerating capacity), whereby a significant change in performances and an increase in flammability of refrigerant can be prevented.

What is claimed is:

1. A method for charging a refrigerant blend characterized in that, in case of employing as refrigerant a non-azeotropic blend comprising 23% by weight of difluoromethane, 25% by weight of pentafluoroethane and 52% of 1,1,1,2-tetrafluoroethane, composition change associated with transfer is allow to fall within the permissible range of performance of the non-azeotropic refrigerant blend by adjusting a composition of the non-azeotropic blend in a feeding container such as bomb to 23.5–25.0% by weight of difluoromethane, 23.5–25.0% by weight of pentafluoroethane and 50.0–53.0% by weight of 1,1,1,2-tetrafluoroethane followed by discharging the non-azeotropic blend from a liquid phase at 40° C. or less.

2. The method for charging a refrigerant blend according to claim 1 wherein the composition change associated with the transfer is allowed to fall within ±3% by weight of performance of the non-azeotropic refrigerant blend.

3. A method for producing a vapor compression refrigerating equipment with a composition range of 23% by weight of difluoromethane, 25% by weight of pentafluoroethane and 52% by weight of 1,1,1,2-tetrafluoroethane comprising discharging a liquid phase in a feeding container with a blend composition of 23.5–25.0% by weight of difluoromethane, 23.5–25.0by weight of pentafluoroethane and 50.0–53.0% by weight of 1,1,1,2-tetrafluoroethane at not more than 40° C. and transferring it to a main body of the vapor compression refrigerating equipment.

* * * * *